(12) United States Patent
Ahn et al.

(10) Patent No.: US 10,205,576 B2
(45) Date of Patent: Feb. 12, 2019

(54) ACKNOWLEDGEMENT TRANSMISSION METHOD AND APPARATUS IN WIRELESS COMMUNICATION SYSTEM

(71) Applicant: LG Electronics Inc., Seoul (KR)

(72) Inventors: Joonkui Ahn, Seoul (KR); Dongyoun Seo, Seoul (KR); Suckchel Yang, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 15/102,689

(22) PCT Filed: Dec. 23, 2014

(86) PCT No.: PCT/KR2014/012740
§ 371 (c)(1),
(2) Date: Jun. 8, 2016

(87) PCT Pub. No.: WO2015/105291
PCT Pub. Date: Jul. 16, 2015

(65) Prior Publication Data
US 2018/0139026 A1    May 17, 2018

Related U.S. Application Data

(60) Provisional application No. 61/925,658, filed on Jan. 10, 2014.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1664* (2013.01); *H04L 1/1671* (2013.01);
(Continued)

(58) Field of Classification Search
CPC ... H04L 5/0055; H04L 1/1846; H04L 1/1671; H04L 5/1469; H04L 1/1692; H04L 1/1664; H04W 72/0446
See application file for complete search history.

(56) References Cited

U.S. PATENT DOCUMENTS

2013/0223299 A1* 8/2013 Yang ..................... H04L 1/1685
370/280
2013/0258914 A1* 10/2013 Seo ....................... H04L 1/1896
370/280
(Continued)

FOREIGN PATENT DOCUMENTS

CN        103460740 A     12/2013
WO        2012074335      6/2012
(Continued)

*Primary Examiner* — Brian D Nguyen
(74) *Attorney, Agent, or Firm* — Dentons US LLP

(57) ABSTRACT

Provided are a method and an apparatus for transmitting acknowledgement/non-acknowledgement (ACK/NACK) of a terminal in a carrier wave aggregation system. The method comprises: receiving a UL grant by a subframe n–k1 of a first serving cell, wherein the UL grant comprises uplink allocation and piggyback information, wherein the piggyback information indicates the number of first physical downlink shared channels (PDSCHs) scheduled before the subframe n–k1; attempting a detection of a second PDSCH by a subframe n–k2 of a second serving cell; and transmitting an uplink transmission block and ACK/NACK information through a physical uplink shared channel (PUSCH) on the basis of the uplink allocation by subframe n, wherein n, k1 and k2 are constants, k1>k2, and the ACK/NACK information may comprise a first ACK/NACK according to the piggyback information, and a second ACK/NACK corresponding to the detected second PDSCH.

9 Claims, 12 Drawing Sheets

(51) Int. Cl.
*H04L 1/16* (2006.01)
*H04W 72/04* (2009.01)
*H04L 5/14* (2006.01)

(52) U.S. Cl.
CPC .......... *H04L 1/1692* (2013.01); *H04L 1/1864* (2013.01); *H04L 5/1469* (2013.01); *H04W 72/0446* (2013.01)

(56) References Cited

U.S. PATENT DOCUMENTS

| | | | |
|---|---|---|---|
| 2013/0286905 A1 | 10/2013 | Yang et al. | |
| 2013/0286990 A1* | 10/2013 | Park | H04L 1/1861 370/329 |
| 2013/0315115 A1* | 11/2013 | Kim | H04J 11/0056 370/280 |
| 2013/0322343 A1* | 12/2013 | Seo | H04W 24/02 370/328 |
| 2014/0036889 A1* | 2/2014 | Kim | H04L 1/1854 370/336 |
| 2017/0188315 A1* | 6/2017 | Kim | H04L 5/001 |

FOREIGN PATENT DOCUMENTS

| | | |
|---|---|---|
| WO | 2012108720 | 8/2012 |
| WO | 2012109195 | 8/2012 |
| WO | 2013/105838 A1 | 7/2013 |
| WO | 2014003456 | 1/2014 |

* cited by examiner

ACKNOWLEDGEMENT TRANSMISSION METHOD AND APPARATUS IN WIRELESS COMMUNICATION SYSTEM

This application is a 35 USC § 371 National Stage entry of International Application No. PCT/KR2014/012740 filed Dec. 23, 2014, and claims priority to U.S. Provisional Application No. 61/925,658 filed Jan. 10, 2014, all of which are hereby incorporated by reference in their entireties as if fully set forth herein.

BACKGROUND OF THE INVENTION

Field of the Invention

The present invention relates to wireless communications, and more particularly, to a method and apparatus for transmitting acknowledgement (ACK)/non-acknowledgement (NACK) indicating a reception confirmation in a wireless communication system supporting carrier aggregation.

Related Art

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

The latest communication standard (e.g., 3GPP LTE-A or 802.16m) considers to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

When acknowledgement (ACK)/non-acknowledgement (NACK) for a different cell is transmitted by using one cell in the carrier aggregation system, there may be a problem in an ACK/NACK timing.

SUMMARY OF THE INVENTION

There is provided a method and apparatus for transmitting acknowledgement (ACK)/non-acknowledgement (NACK) in a carrier aggregation system.

According to one aspect, provided is a method of transmitting ACK/NACK by a terminal in a wireless communication system. The method of transmitting the ACK/NACK by the terminal in the wireless communication system may include: receiving an uplink (UL) grant in a subframe n−k1 of a first serving cell, wherein the UL grant includes uplink allocation and piggyback information, and the piggyback information indicates the number of first physical downlink shared channels (PDSCHs) scheduled before the subframe n−k1; attempting detection of a second PDSCH in a subframe n−k2 of a second serving cell; and transmitting an uplink transport block and ACK/NACK information through a physical uplink shared channel (PUSCH) on the basis of the uplink allocation in a subframe n, wherein n, k1 and k2 are integers, where k1>k2, and wherein the ACK/NACK information includes first ACK/NACK according to the piggyback information, and second ACK/NACK corresponding to the detected second PDSCH.

According to one aspect of the present invention, ACK/NACK for a plurality of cells can be transmitted on the basis of a UL DAI.

DESCRIPTION OF EXEMPLARY EMBODIMENTS

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks A wireless communication system includes at least one base station (BS). Each BS provides a communication service to a specific geographical region. The geographical region may be divided into a plurality of sub-regions. The BS is generally a fixed station that communicates with a user equipment (UE) and may be referred to as another terminology, such as an evolved Node-B (eNB), a base transceiver system (BTS), an advanced base station (ABS), etc.

The UE may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) implies communication from the BS to the UE, and an uplink (UL) implies communication from the UE to the BS.

The wireless communication system may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS and the UE can communicate with each other by using a radio resource called a radio frame.

Figure 1:
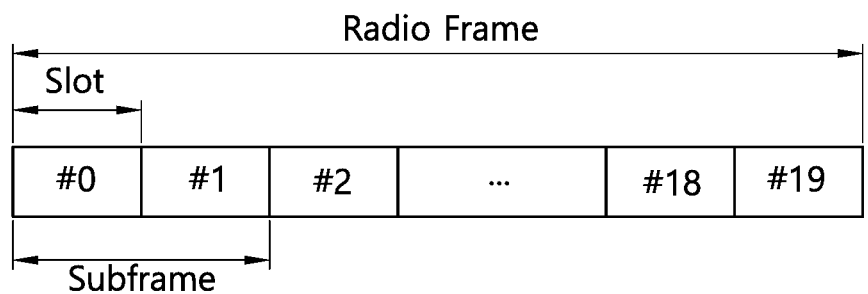
FIG. 1 shows a radio frame structure.

FIG. 1 shows a radio frame structure.

Referring to FIG. 1, a radio frame (simply also referred to as a frame) consists of 10 subframes in a time domain. One subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in the time domain. Since the 3GPP LTE uses OFDMA in a downlink, one symbol period is represented with the OFDM symbol. The OFDM symbol can be referred to as other terms according to a multiple access scheme. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 2:
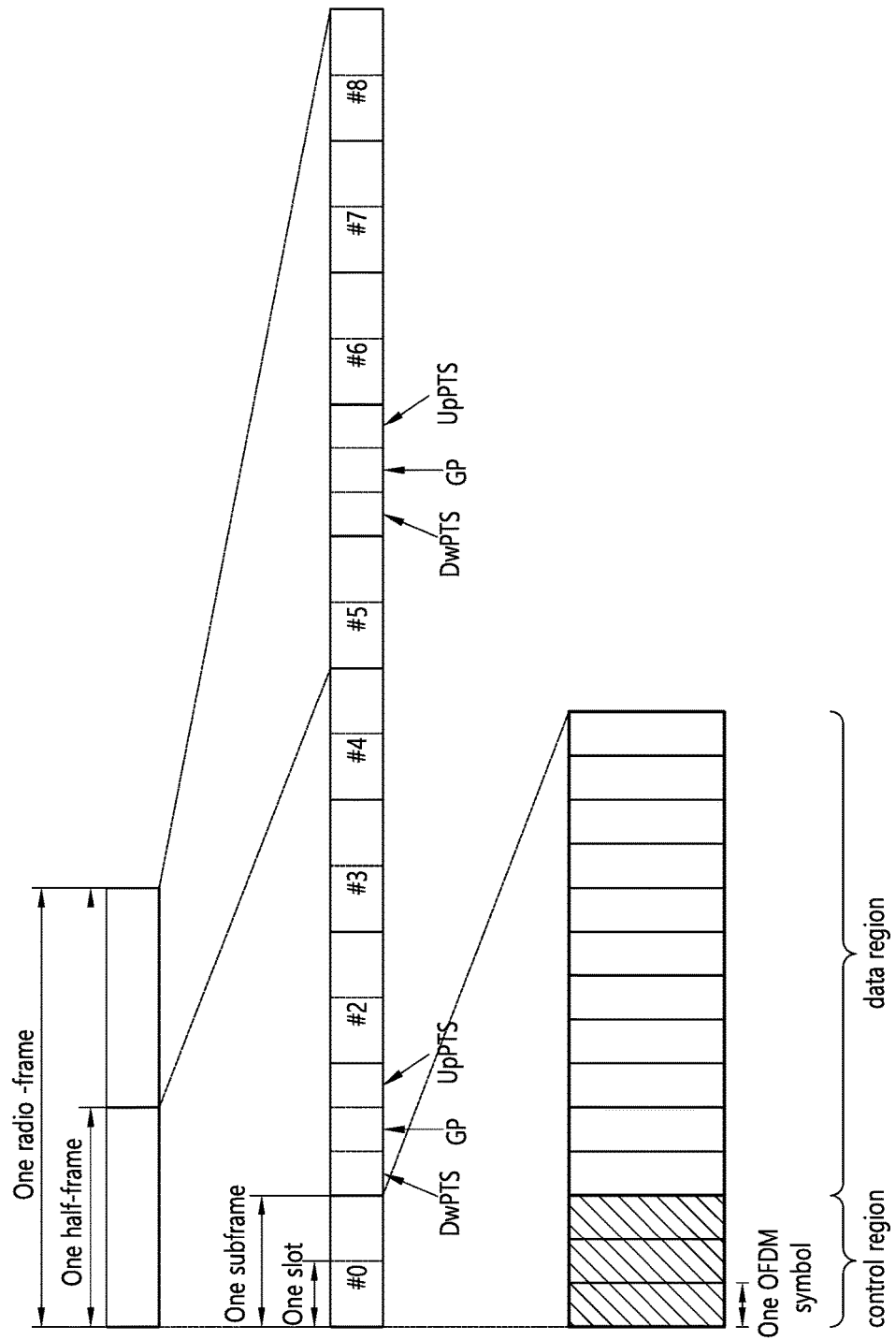
FIG. 2 shows an exemplary structure of a downlink radio frame.

FIG. 2 shows an exemplary structure of a downlink radio frame.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

For example, in TDD, a subframe having an index #1 and an index #6 is called a special (S) subframe, and includes a downlink pilot time slot (DwPTS), a guard period (GP), and an uplink pilot time slot (UpPTS).

In TDD, a downlink (DL) subframe and an uplink (UL) subframe co-exist in one radio frame. Table 1 shows an example of a configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When receiving a UL-DL configuration from a BS, a wireless device may be aware of which subframe is a DL subframe or a UL subframe according to the configuration of the radio frame.

A DL subframe is divided into a control region and a data region in a time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) and a physical broadcast channel (PBCH) may be allocated to the data region.

Examples of the control channel that can be allocated to the control region include a physical downlink control channel (PDCCH), a physical control format indicator channel (PCFICH), a physical hybrid automatic repeat request (HARQ) indicator channel (PHICH), etc. A UE may read data information transmitted through the data channel by decoding control information transmitted through the PDCCH. The number of OFDM symbols included in the control region of the subframe may be known by using the PCFICH. The PHICH carries a hybrid automatic repeat request (HARQ) acknowledgement (ACK)/not-acknowledgment (NACK) signal in response to UL transmission.

A physical downlink shared channel (PDSCH) may be allocated to the data region. Hereinafter, for convenience of explanation, a control region may be called a PDCCH region, and a data region may be called a PDSCH region.

A plurality of PDCCHs may be transmitted in the control region, and control information transmitted through the PDCCH is referred to as downlink control information (hereinafter, DCI). The DCI transmits uplink scheduling information (called an uplink (UL) grant), downlink scheduling information (called a downlink (DL) grant), an uplink power control command, control information for paging, control information for indicating a random access channel (RACH) response, etc.

If a plurality of PDCCHs are transmitted in a subframe, the UE monitors the plurality of PDCCHs in every subframe. Herein, monitoring is an operation in which the UE attempts PDCCH decoding according to a PDCCH format.

Figure 3:
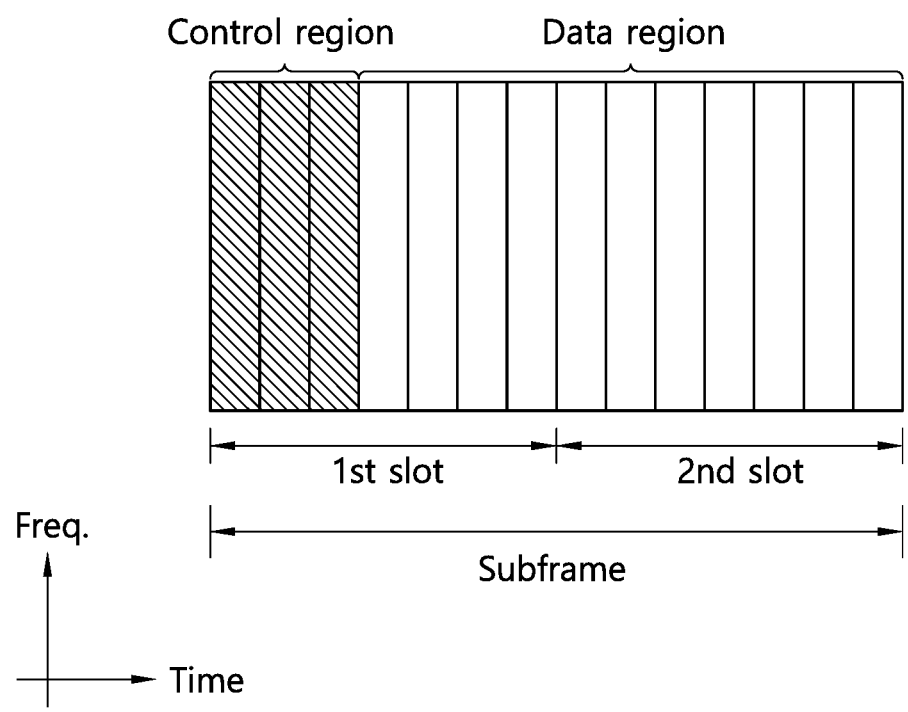
FIG. 3 shows a structure of an uplink (UL) subframe.

FIG. 3 shows a structure of a UL subframe.

Referring to FIG. 3, the UL subframe may be divided into a control region and a data region in a frequency domain. A physical uplink control channel (PUCCH) for transmitting UL control information is allocated to the control region. A physical uplink shared channel (PUSCH) for transmitting data (optionally, control information may be transmitted together) is allocated to the data region. According to a configuration, a UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) may be transmitted on the PUCCH. Periodic CSI may be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH.

In the wireless communication system, the UE receives scheduling information such as a DL grant, a UL grant, etc., through the PDCCH, and performs an operation of receiving the PDSCH and transmitting the PUSCH on the basis of the scheduling information. In general, the DL grant and the PDSCH are received in the same subframe. In addition, in case of FDD, the PUSCH is transmitted four subframes later than a subframe in which the UL grant is received.

Now, HARQ performed in 3GPP LTE will be described.

An HARQ scheme may be divided into a synchronous HARQ scheme and an asynchronous HARQ scheme according to a retransmission timing. In the synchronous scheme, when initial transmission fails, subsequent retransmission is achieved at a predetermined timing. In the asynchronous scheme, a retransmission timing may be newly scheduled or may be achieved through additional signaling. At present, in 3GPP LTE, the asynchronous HARQ scheme is used in a downlink case, and the synchronous HARQ scheme is used in an uplink case.

In case of the synchronous HARQ scheme, a timing needs to be configured for a UL grant transmitted on a PDCCH in a DL subframe (Time A, subframe n−k), transmission of a PUSCH for this (Time B, subframe n), transmission of a DL PHICH as an ACK/NACK response for PUSCH transmission (Time C, subframe n+j), retransmission of a PUSCH for a DL PHICH (Time D, subframe n+j+r), and a UL grant for a retransmission PUSCH (Time E, subframe n+j+r−k'). When the timing is configured, kmin (e.g., kmin=4) which is the minimum number of subframes that can be prepared must be taken into account in consideration of a propagation delay which occurs in DL-to-UL transmission or UL-to-DL transmission and a processing time required for receiving and processing a control signal and a data signal.

A timing interval between transmissions of respective subframes described above may be summarized as follows. The timing interval is a function for a subframe number, and may vary for each subframe in which an HARQ process is performed.

① PUSCH initial transmission interval after UL grant (GU timing): k

② PHICH transmission interval after PUSCH transmission (UH): j

③ Synchronous HARQ PUSCH retransmission interval after PHICH transmission (HU): r ④ HARQ PUSCH retransmission interval after retransmission UL grant (GU): k'

In a 3GPP LTE system, as described above, FDD and TDD are present as a frame structure type.

Figure 4:
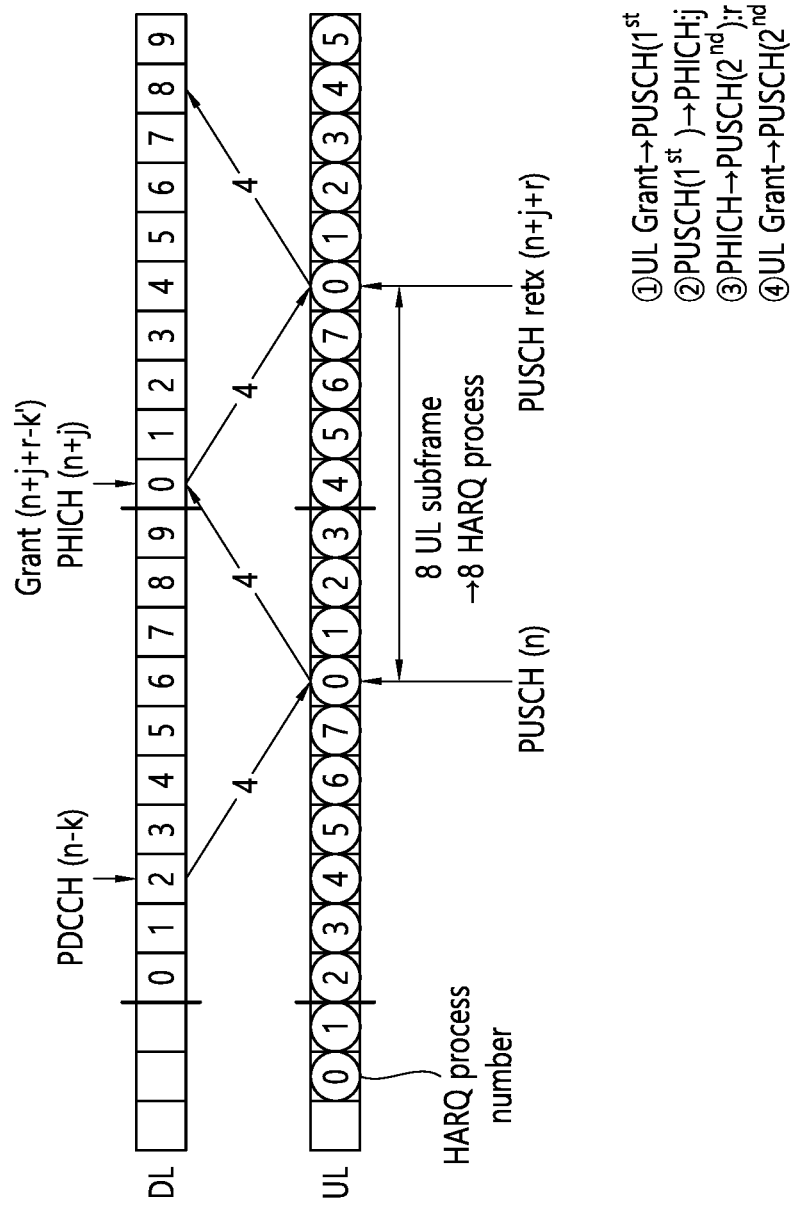
FIG. 4 shows a synchronous hybrid automatic repeat request (HARQ) timing in frequency division duplex (FDD).

FIG. 4 shows a synchronous HARQ timing in FDD.

In FIG. 4, illustrated are a downlink subframe n−k in which a UL grant is transmitted by a BS through a PDCCH, an uplink subframe n in which a PUSCH scheduled by the UL grant is transmitted by a UE, a downlink subframe n+j in which ACK/NACK is transmitted on a PHICH by the BS as a response of the PUSCH, and an uplink subframe n+j+r in which the PUSCH is retransmitted by the UE if the ACK/NACK is NACK. Meanwhile, the UE may retransmit the PUSCH on the basis of the ACK/NACK received through the PHICH, or may retransmit the PUSCH in the subframe n+j+r on the basis of the UL grant after the UL grant is received in a subframe n+j+r−k'.

In case of FDD, a DL subframe and a UL subframe are present contiguously in every subframe, and their numbers are matched in a 1:1 ratio. Therefore, a relation of the aforementioned TimeA, TimeB, TimeC, TimeD, and TimeE is constantly maintained, and a timing interval is k=j=r=k'=4. Accordingly, the number of HARQ processes may be determined depending on the number of UL subframes after a scheduled PUSCH is transmitted and until the PUSCH is retransmitted. As illustrated, if a minimum period from data transmission and next data transmission is 8 subframes, 8 independent HARQ processes may be performed. Numbers 0 to 9 marked in DL frames indicate subframe indices, and numbers 0 to 8 marked in UL frames indicate HARQ process numbers.

Unlike in the FDD, DL subframes and UL subframes coexist in TDD. Generally, the number of the UL subframes is less than the number of DL subframes. Accordingly, in preparation for a case where UL subframes are insufficient to transmit an ACK/NACK signal, it is supported to transmit a plurality of ACK/NACK signals in one UL subframe with respect to a plurality of DL transport blocks.

In case of TDD, the DL subframe and the UL subframe are selected according to a UL-DL configuration of Table 1, and there is a case where a ratio thereof is not matched in a 1:1 ratio. Therefore, values k, j, r, k' may vary in consideration of kmin=4, and values k, j, r, k' may also vary depending on a subframe number in one radio frame.

The following table shows a GU timing k as a PUSCH initial transmission interval after a UL grant in 3GPP LTE [GU timing: UL grant(n−k), PUSCH(n)].

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 7/6 | 7 | 4 | | | 7/6 | 7 | 4 |
| 1 | | | 6 | 4 | | | | 6 | 4 | |

TABLE 2-continued

| UL-DL Configuration | 0 | 1 | 2 | 3 | 4 | 5 | 6 | 7 | 8 | 9 |
|---|---|---|---|---|---|---|---|---|---|---|
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |
| FDD | 4 | 4 | 4 | 4 | 4 | 4 | 4 | 4 | 4 | 4 |

In Table 2, a PDCCH including a UL grant is transmitted through a DL subframe n−k, and a PUSCH is transmitted through a UL subframe n. In this case, an initial transmission interval of the PUSCH after the UL grant may be k.

Figure 5:
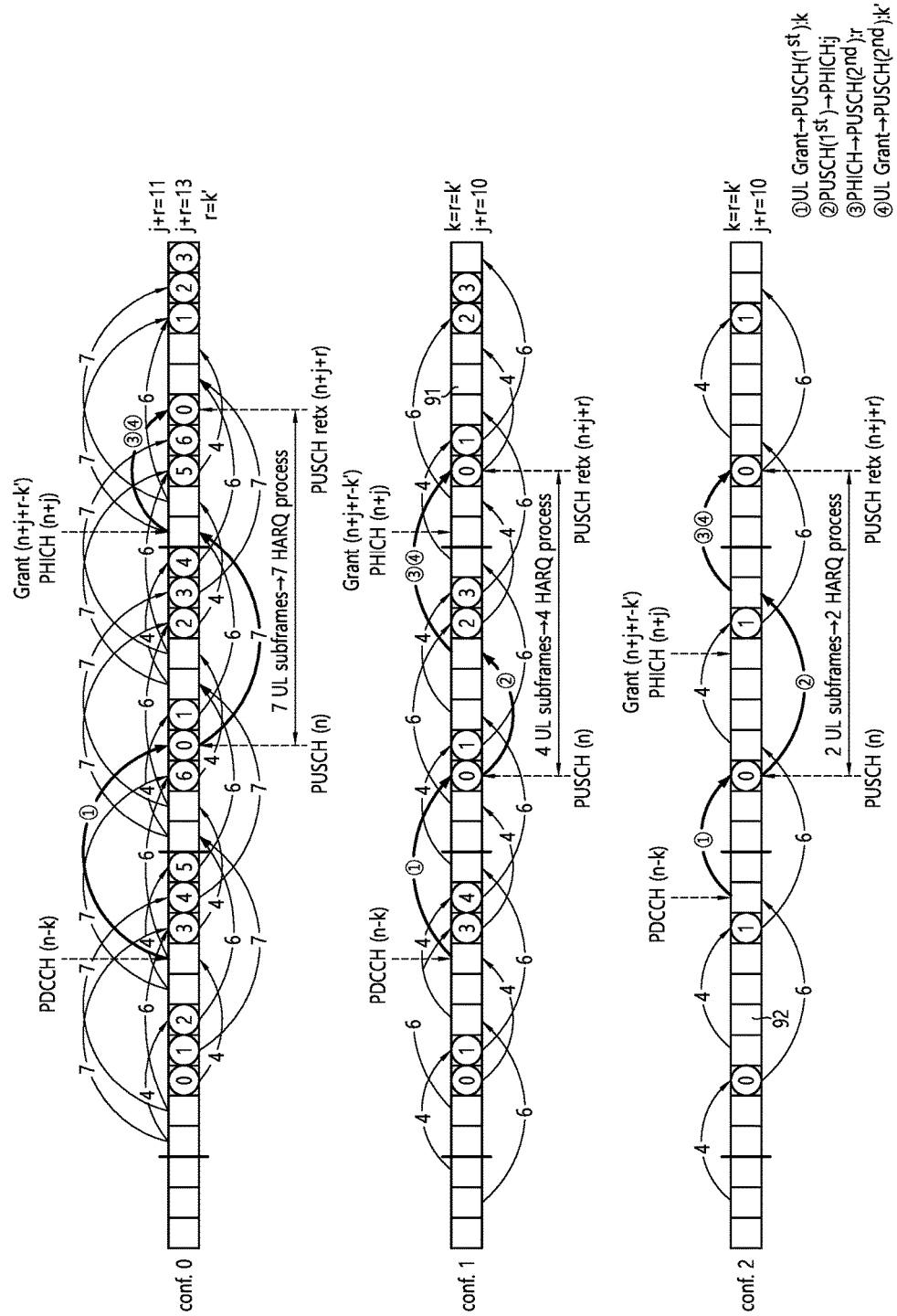
FIG. 5 shows a synchronous HARQ timing for UL-downlink (DL) configurations 0 to 2.
Figure 6:
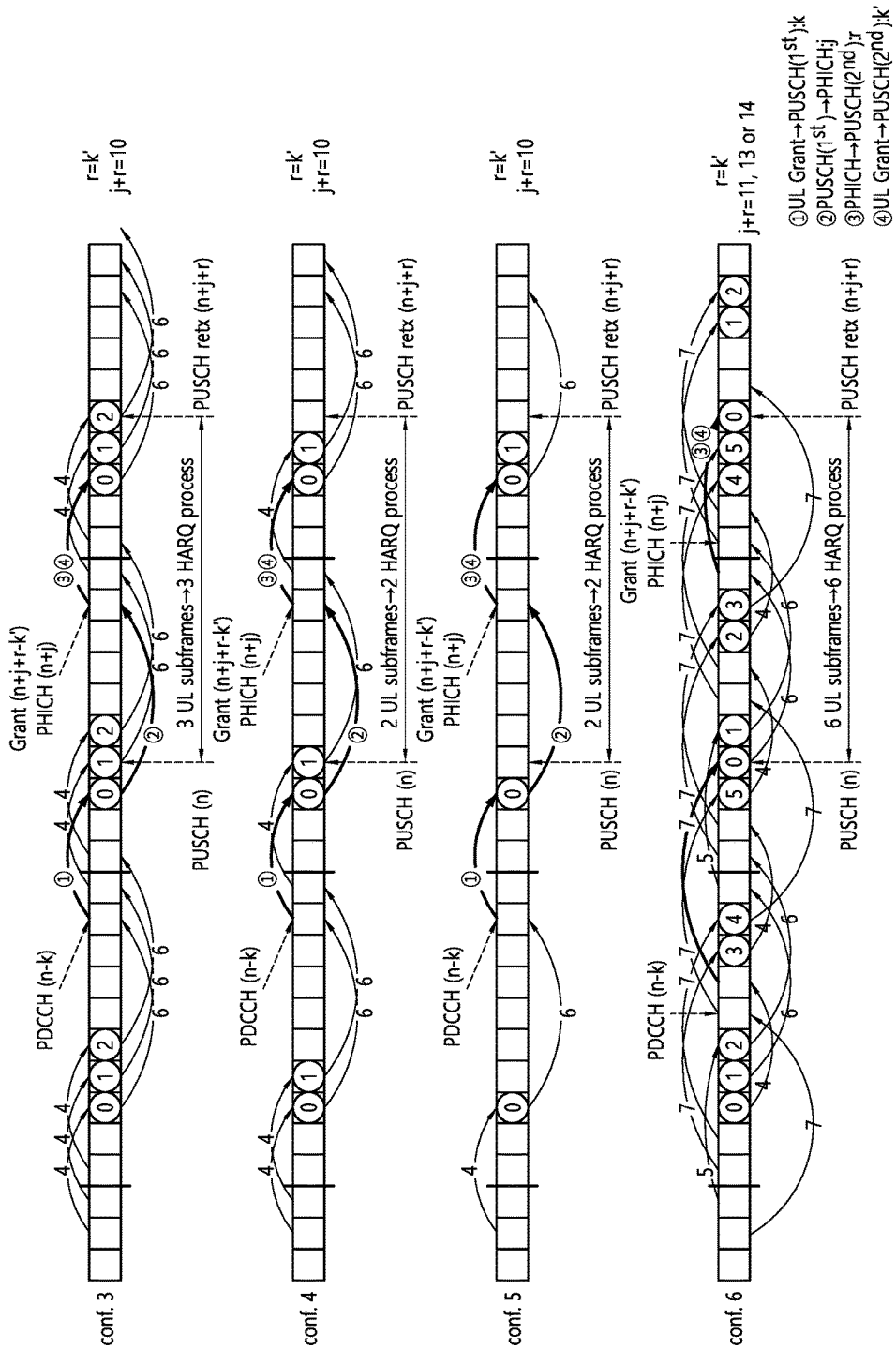
FIG. 6 shows a synchronous HARQ timing for UL-DL configurations 3 to 6.

FIG. 5 and FIG. 6 show examples of a synchronous HARQ timing for a UL-DL configuration in one TDD. FIG. 5 shows a synchronous HARQ timing for UL-DL configurations 0 to 2, and FIG. 6 shows a synchronous HARQ timing for UL-DL configurations 3 to 6.

In FIG. 5, a synchronous HARQ timing is illustrated for each of the UL-DL configurations 0 to 2. Illustrated are a subframe n−k which is a subframe for receiving a PDCCH including a UL grant for scheduling the PUSCH, a subframe n+j which is a subframe for receiving ACK/NACK for the PUSCH through a PHICH, a subframe n+j+r−k' which is a subframe for receiving a UL grant for PUSCH retransmission, and a subframe n+j+r which is a subframe for retransmitting the PUSCH when a subframe in which the UE transmits a PUSCH is a subframe n.

In FIG. 6, a subframe n, a subframe n−k, a subframe n+j, a subframe n+j+r−k', a subframe n+j+r, or the like are illustrated for UL-DL configurations 3 to 6.

In FIG. 5 and FIG. 6, subframes including numbers are UL subframes, and each number is an HARQ process number. Subframes not including the numbers are DL subframes or special subframes. Further, in a DL subframe associated with each UL subframe by an arrow mark, a PDCCH including a UL grant and a PHICH including ACK/NACK is transmitted by a BS. Among DL subframes included in a TDD frame, a DL subframe not associated with a UL subframe by an arrow mark is a DL subframe in which a PHICH does not exist. For example, in FIG. 5, DL subframes 91 and 92 are one example of the DL subframe in which the PHICH does not exist.

In TDD, since the number of UL subframes is insufficient, DL transport blocks received in a plurality of DL subframes are transmitted using one ACK/NACK. This is said that M DL subframes are associated with a UL subframe n. An ACK/NACK mismatch may occur between the BS and the UE due to missing of the DL subframe (or PDCCH).

Assume that M=3, and the BS transmits three DL transport blocks through three DL subframes. The UE misses the PDCCH in the second DL subframe and thus cannot receive a second transport block at all, and can receive only the remaining first and third transport blocks. In this case, if ACK/NACK bundling is used, the UE erroneously transmits ACK/NACK regarding the first and third transport blocks without considering the second transport block. That is, the BS cannot recognize that the UE fails to receive the second transport block.

In order to solve this error, a downlink assignment index (DAI) is included in a DL grant on the PDCCH. The DAI indicates an accumulative value of the PDCCH which transmits a PDSCH allocated thereto. A value of the 2-bit DAI is increased in an orderly manner starting from 1, and a modulo-4 operation is applicable again from DAI=4. If M=5 and all of 5 DL subframes are scheduled, the DAI may be included in a corresponding PDCCH in the order of DAI=1, 2, 3, 4, 1.

Further, a UL DAI is provided through a UL grant to avoid an ACK/NACK error. In the 3GPP LTE, if one UL subframe exists in a PUCCH and a PUSCH, uplink control information (UCI) is transmitted by being multiplexed with a UL transport block of the PUSCH. For example, if there is a PUSCH transmitted simultaneously with ACK/NACK in a specific UL subframe, the UE performs multiplexing by puncturing the UL transport block and thereafter by inserting corresponding ACK/NACK to the punctured portion. The multiplexed transport block is transmitted on the PUSCH. Transmitting of the UL transport block multiplexed with the UCI is called UCI piggyback. UCI which is piggybacked on the UL transport block is called piggyback UCI. When performing ACK/NACK piggyback, a UL grant for scheduling the PUSCH may include piggyback information (i.e., UL DAI) regarding a payload of piggyback ACK/NACK to adoptively determine a payload size of the piggyback ACK/NACK.

Figure 7:
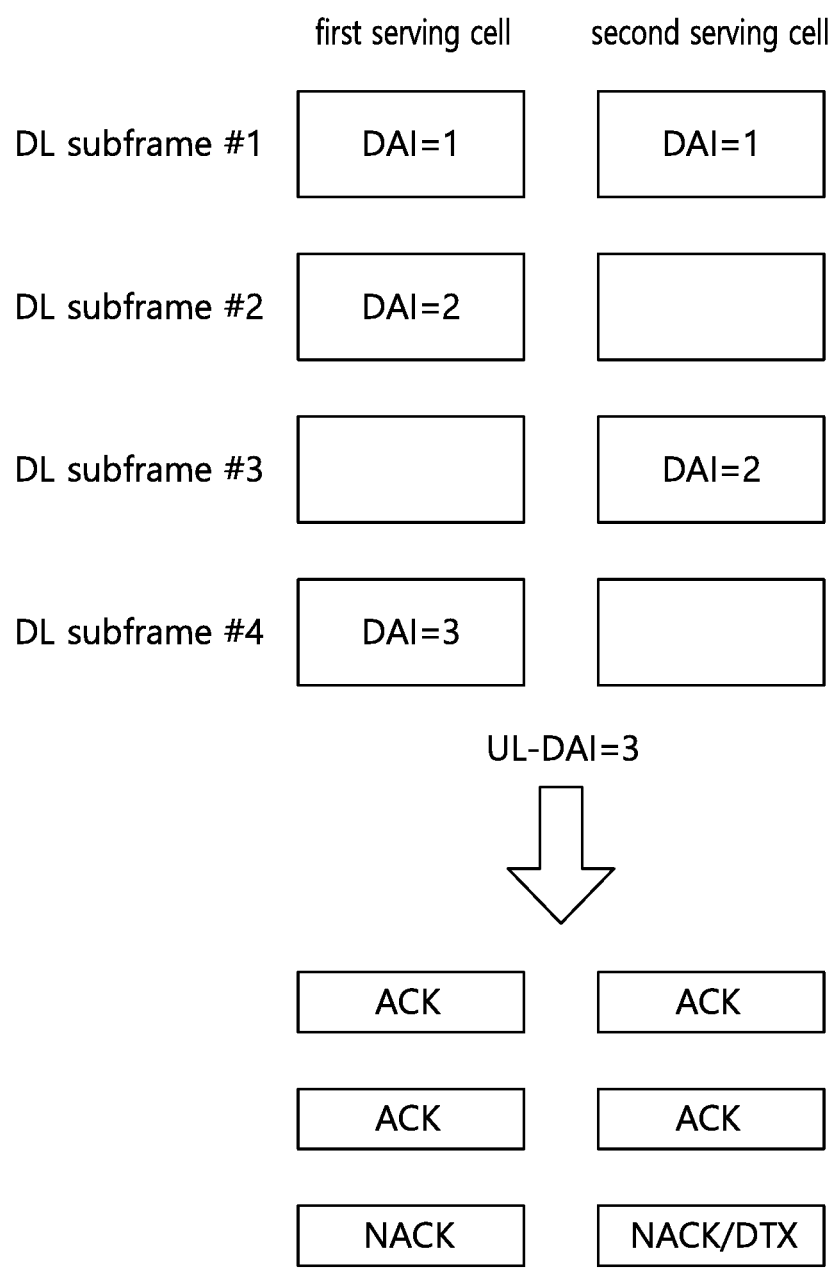
FIG. 7 shows an example of acknowledgement (ACK)/non-acknowledgement (NACK) transmission using piggyback information.

FIG. 7 shows an example of ACK/NACK transmission using piggyback information.

A UL DAI may indicate the number of scheduled PDSCHs or the number of subframes having the scheduled PDSCH. When considering up to a TDD configuration with DL:UL=9:1 on the basis of 2-bit UL-DAI, a modulo-4 operation can be applied as follows.

If the number of scheduled PDSCHs is 1 or 5 or 9, UL-DAI=1.
If the number of scheduled PDSCHs is 2 or 6, UL-DAI=2.
If the number of scheduled PDSCHs is 3 or 7, UL-DAI=3.
If the number of scheduled PDSCHs is 0 or 4 or 8, UL-DAI=4.

In an example of FIG. 7, it is assumed that M=4, and 4 DL subframes #1, #2, #3, and #4 are associated with a specific UL subframe. The number of DL subframes and arrangement of the subframes are for exemplary purposes only.

In a first serving cell, a UE detects respective PDCCHs in the DL subframes #1, #2, and #4, and receives respective DL transport blocks through corresponding PDSCHs. Herein, DAI=1, DAI=2, and DAI=3.

In a second serving cell, the UE detects respective PDCCHs in the DL subframes #1 and #3, and receives respective DL transport blocks through corresponding PDSCHs. Herein, DAI=1 and DAI=2.

Subsequently, the UE receives a UL grant. The UL grant includes a UL-DAI and a resource allocation for the PUSCH. Herein, UL-DAI=3 since the UL-DAI includes the maximum number of DAIs in the two serving cells (or the maximum number of scheduled PDSCHs).

The UE determines an ACK/NACK state according to the UL-DAI. In this example, UL-DAI=3.

It is assumed that, in the first serving cell, a response for $1^{st}$ and $2^{nd}$ PDSCHs is ACK and a response for a $3^{rd}$ PDSCH is NACK, and in the second serving cell, a response for both of the two PDSCHs is ACK. For a case where there is no corresponding DAI, it can be regarded that the ACK/NACK state is NACK or DTX.

Therefore, an ACK/NACK response for the first serving cell is (ACK, ACK, NACK), and an ACK/NACK response for the second serving cell is (ACK, ACK, NACK/DTX).

Now, a carrier aggregation system is described.

Figure 8:
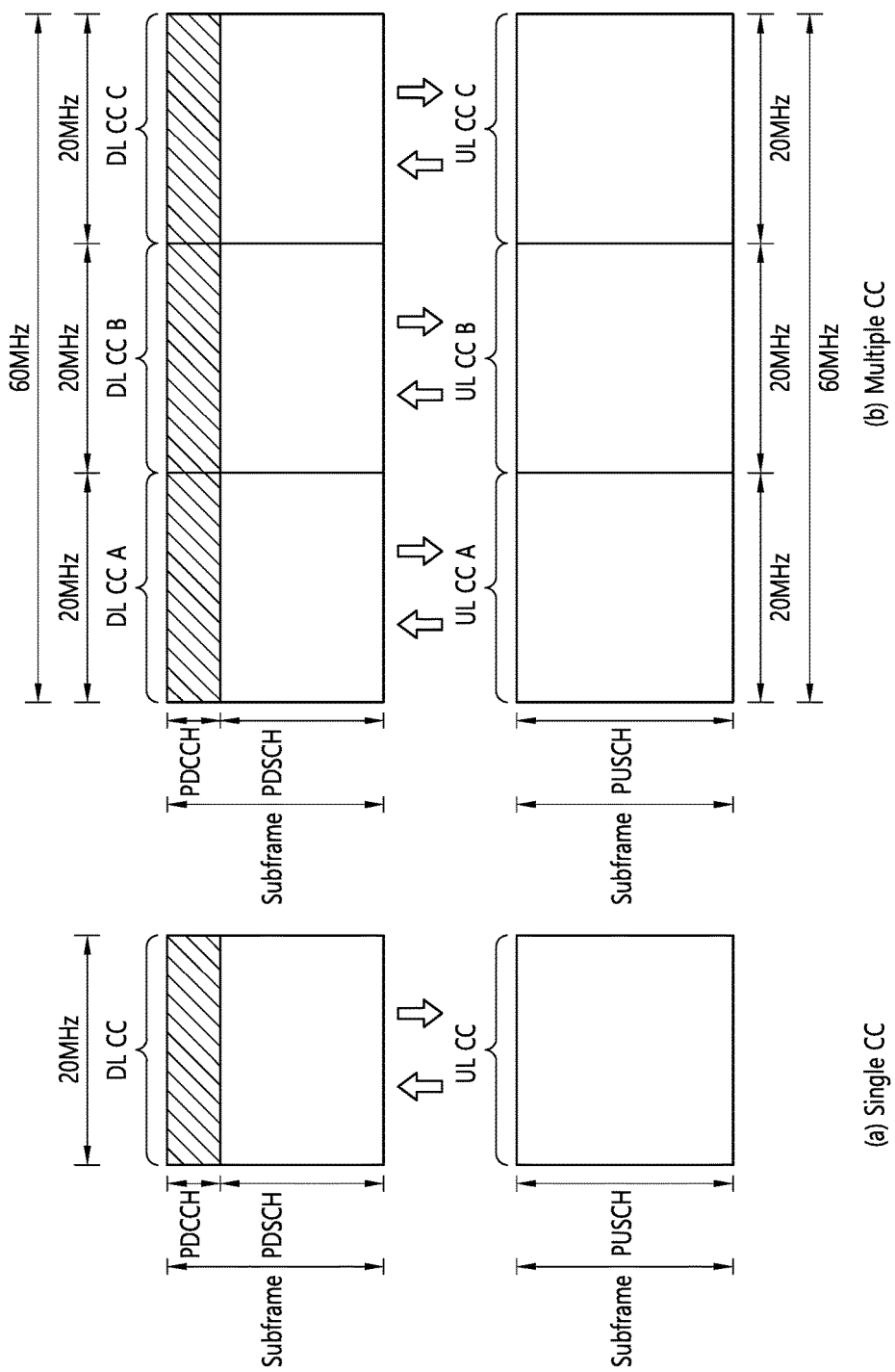
FIG. 8 shows an example of comparing the legacy single carrier system and a carrier aggregation system.

FIG. 8 shows an example of comparing the legacy single carrier system and a carrier aggregation system.

The single carrier system supports only one carrier as to a UE in an uplink and a downlink. Although the carrier may have various bandwidths, only one carrier is assigned to the UE. Meanwhile, multiple component carriers (CCs), i.e., DL CCs A to C and UL CCs A to C, can be assigned to the UE in the carrier aggregation (CA) system. A component carrier (CC) implies a carrier used in the carrier aggregation system, and may be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted that both cases of contiguous CCs and non-contiguous CCs are included.

One DL CC or a pair of DL-CC/UL-CC may correspond to a serving cell. Under a network environment in which carrier aggregation is supported, not only time division duplex (TDD) cell-TDD cell or a frequency division duplex (FDD) cell-FDD cell but also a TDD cell-FDD cell may also be aggregated. The TDD cell is a cell for which TDD is configured, and the FDD cell is a cell for which FDD is configured.

Further, the serving cell may be divided into a primary cell, a secondary cell, and a serving cell. The primary cell implies a cell which operates at a primary frequency, and also implies a cell in which the UE performs an initial connection establishment procedure or a connection re-establishment procedure with respect to a BS or a cell indicated as the primary cell in a handover procedure. The secondary cell implies a cell which operates at a secondary frequency, and is configured when an RRC connection is once established and is used to provide an additional radio resource.

The carrier aggregation system may support cross-carrier scheduling or non cross-carrier scheduling. In the cross-carrier scheduling, a scheduling cell and a scheduled cell are different. The scheduling cell is a cell for monitoring and receiving a DL control channel (e.g., PDCCH), and the scheduled cell is a cell for receiving or transmitting a PDSCH/PUSCH scheduled by the DL control channel. When the cross carrier scheduling is configured, DL control information in the DL control channel may include a DL/UL grant and a carrier indicator field (CIF) indicating the scheduled cell. In the non cross-carrier scheduling, the scheduling cell and the scheduled cell are identical.

In 3GPP LTE Rel-10, only the same frame structure type cell can be aggregated. Further, if a plurality of TDD cells are aggregated, only the same configuration is used among the UL-DL configurations of Table 1. If the aggregated cells use the same UL-DL configuration or uses the non cross-carrier scheduling, the synchronous HARQ-type resource allocation and retransmission timing interval used in the conventional TDD may also be applied without alteration.

However, if the aggregated cells have different UL-DL configurations or different frame structure types and if cross carrier scheduling is applied thereto, there may be no DL subframe at a timing of transmitting a UL PUSCH.

For example, it is assumed a case where a primary cell is a TDD cell, a secondary cell is an FDD cell, and cross carrier scheduling is applied. In this case, a DL subframe in which a UL grant will be transmitted may exist in the primary cell, and a UL subframe in which a PUSCH scheduled by the UL grant will be transmitted may exist in the secondary cell. It is assumed that a synchronous HARQ timing for a single carrier is applied to a time relation of the DL subframe of the primary cell and the UL subframe of the secondary cell. In this case, according to the synchronous HARQ timing for the single carrier, a DL subframe in which a UL grant for scheduling a UL subframe of the secondary cell may not exist in the primary cell. This is because the primary cell is the TDD cell, and thus the DL subframe does not contiguously exist. Therefore, there is a need to determine the synchronous HARQ timing in consideration of aggregation between carriers which use different frame structures.

In addition, when the FDD cell and the TDD cell are aggregated, a GU timing k of the TDD cell may follow a timing indicated through a system information block (SIB) for the TDD cell, an RRC signaling, or an MAC signaling. Alternatively, if the FDD cell and two or more TDD cells are aggregated, the GU timing k of the TDD cell may be derived through a combination of UL/DL configurations of two TDD cells. The GU timing k of the TDD cell may be one of the timings of Table 2 or may be a newly defined timing.

In case of using cross carrier scheduling for a cell aggregated as described above, the GU timing k may be configured variously, which may result in a problem in ACK/NACK transmission.

Figure 9:
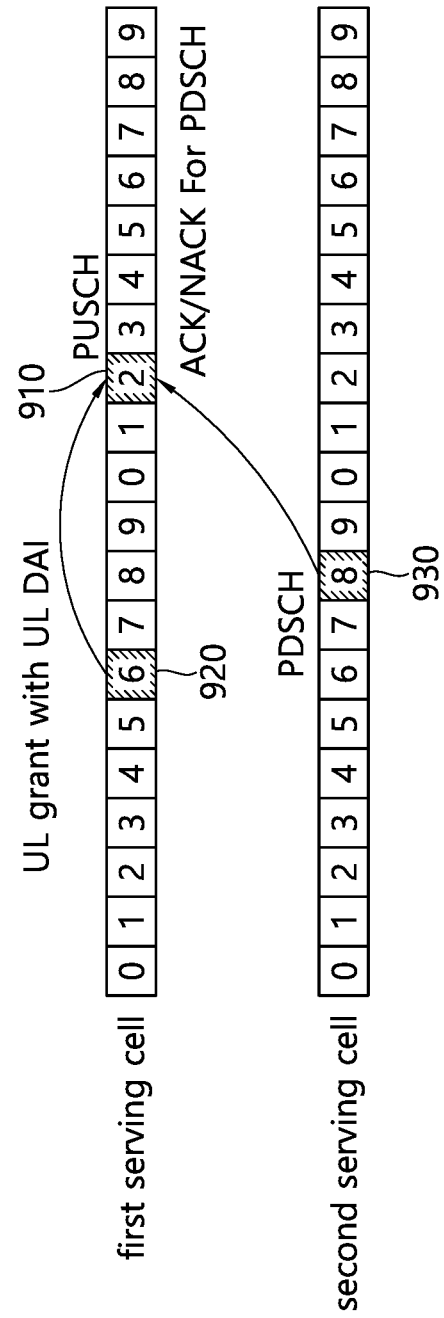
FIG. 9 illustrates an example of a problem of ACK/NACK transmission, which may occur in multiple-cell aggregation.

FIG. 9 illustrates an example of a problem of ACK/NACK transmission, which may occur in multiple-cell aggregation.

A first serving cell may be a TDD cell and a second serving cell may be an FDD cell, but the present invention is not limited thereto. It is assumed that the FDD cell follows a fixed timing, that is, a GU timing of 4 (k=4), and the TDD cell follows a GU timing of the UL-DL configuration #1 of Table 2.

A UL grant for a PUSCH for a subframe #2 910 of the first serving cell is transmitted on a subframe 920 which is 6 subframes earlier. The UL grant includes a UL DAI other than resource allocation for the PUSCH. It includes a maximum number of subframes actually scheduled by the PDSCH among DL subframes associated to transmit ACK/NACK through the subframe #2 of the first serving cell. For example, it is assumed the UL DAI=2.

The PDSCH may be scheduled in a subframe #8 930 of the second serving cell. Since the ACK/NACK is transmitted in a primary cell, the ACK/NACK for the PDSCH of the subframe #8 930 must be transmitted in the subframe #2 910 of the first cell.

However, since the UL grant for the subframe #2 910 of the first serving cell is transmitted in the subframe #6 920, the BS determines a UL DAI value in a situation where when the PDSCH will be scheduled is unknown through the second serving cell. That is, scheduling is performed in the subframe #8 930 of the second serving cell after the subframe #2 910 of the first serving cell. In this case, when ACK/NACK is piggybacked on the PUSCH in the subframe #2 910, whether the ACK/NACK will be piggybacked on the basis of only a previously received UL DAI or whether the ACK/NACK will be piggybacked by considering the PDSCH of the subframe #8 930 of the second serving cell other than the UL DAI is a matter to be considered. That is, there is a need to determine whether the ACK/NACK for the PDSCH of the subframe #8 930 of the second serving cell will be piggybacked on the PUSCH in the subframe #2 910.

Hereinafter, it is assumed that the TDD cell and the FDD cell are aggregated, and the UE transmits a PUSCH in a subframe #n. A cell in which the PUSCH is transmitted may be the TDD cell or the TDD cell. It is assumed that the UE receives a UL grant for a UL subframe #n of the TDD cell in a subframe #(n−k1), and receives a PDSCH in a subframe #(n−k2) (where k2<k1) of the FDD cell. In this case, it is described a method in which ACK/NACK of the TDD cell and ACK/NACK of the FDD cell are piggybacked on a PUSCH when the UL grant includes a UL DAI value. When a PDSCH is mentioned in regards to ACK/NACK transmission in the present invention, it may imply a transport block transmitted on a PDSCH or information (e.g., SPS release PDCCH) requiring ACK/NACK feedback transmitted in other DL subframes.

Figure 10:
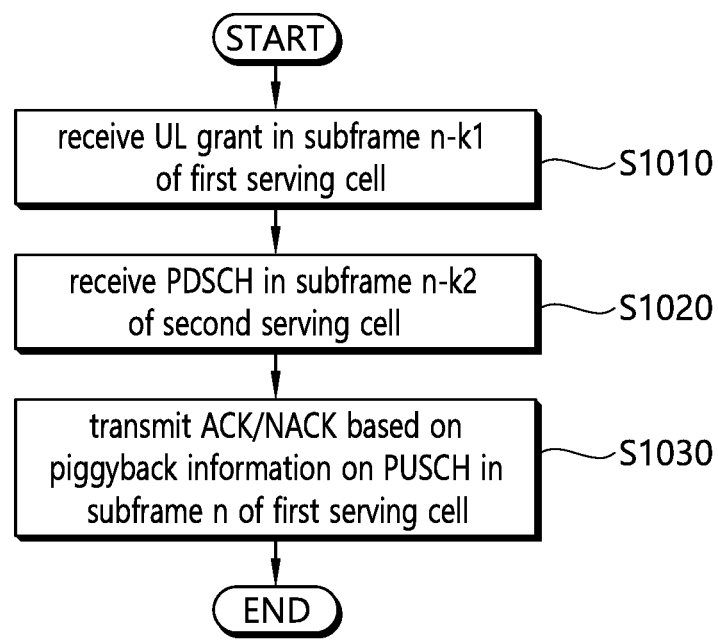
FIG. 10 is a flowchart showing an ACK/NACK transmission method according to an embodiment of the present invention.

FIG. 10 is a flowchart showing an ACK/NACK transmission method according to an embodiment of the present invention.

In step S1010, a UE receives a UL grant in a subframe n−k1 of a first serving cell. The UL grant includes piggyback information and resource allocation for a PUSCH in a subframe n. The PUSCH may be transmitted in the first serving cell. Alternatively, when cross carrier scheduling is configured, the PUSCH may be transmitted in the first serving cell or a second serving cell. The piggyback information may indicate the number of scheduled PDSCHs or the number of subframes having the scheduled PDSCH.

In step S1020, the UE receives a transport block transmitted on the PDSCH in a subframe n−k2 of the second serving cell. Herein, k1>k2.

In step S1030, the UE transmits a UL transport block on the PUSCH of the subframe n, ACK/NACK corresponding to the DL transport block, and/or ACK/NACK based on piggyback information.

Irrespective of a value of the piggyback information, ACK/NACK corresponding to a DL transport block in the subframe n−k2 may be always piggybacked through the PUSCH.

If it is assumed that the piggyback information indicates the maximum number of PDSCHs across a plurality of serving cells, even if the PDSCH is not scheduled until the subframe n−k1, only when the BS sets the piggyback information to 1 for a PDSCH transmitted in the subframe n−k2, ACK/NACK of the PDSCH can be piggybacked. This is because the UE may assume that there is no ACK/NACK to be piggybacked when the value of the piggyback information is set to 0.

However, if the piggyback information is particularly set to 1 for ACK/NACK transmission of the second serving cell, this may cause a result in which unnecessary piggyback information is transmitted for the first serving cell. To avoid such a bit loss, ACK/NACK for a PDSCH received through the subframe n−k2 of the second serving cell is always piggybacked on a PUSCH irrespective of the value of the piggyback information. That is, even if the value of the piggyback information is 0, the ACK/NACK for the second serving cell is transmitted on the PUSCH.

The UE may feedback NACK or DTX as ACK/NACK even if a scheduled PDSCH (or PDCCH) is not detected in the subframe n−k2.

Figure 11:
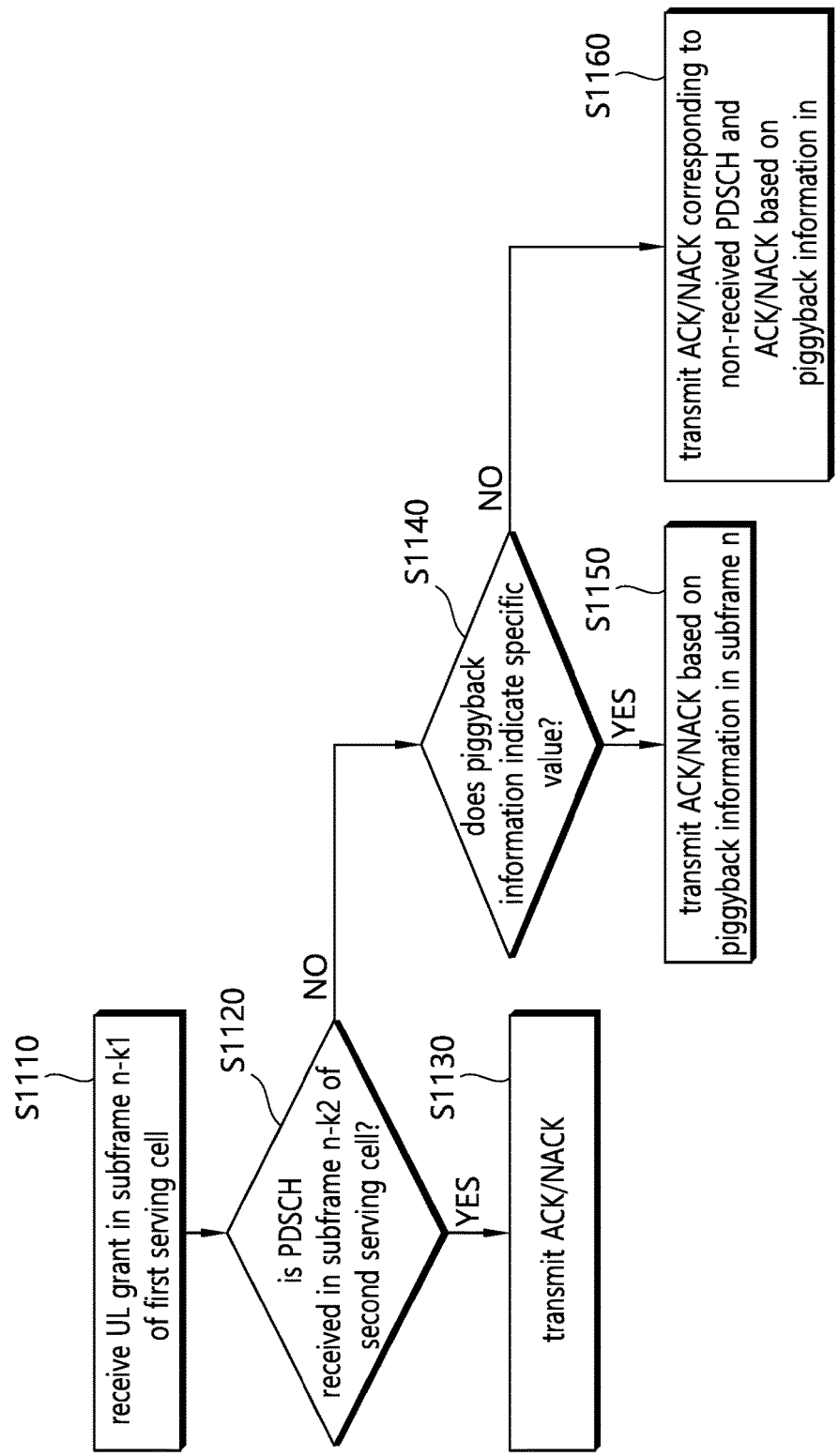
FIG. 11 is a flowchart showing an ACK/NACK transmission method according to another embodiment of the present invention.

FIG. 11 is a flowchart showing an ACK/NACK transmission method according to another embodiment of the present invention.

In step S1110, a UE receives a UL grant in a subframe n−k1 of a first serving cell. The UL grant includes piggyback information and resource allocation for a PUSCH in a subframe n. The PUSCH may be transmitted in the first serving cell. Alternatively, when cross carrier scheduling is configured, the PUSCH may be transmitted in the first serving cell or a second serving cell. The piggyback information may indicate the number of scheduled PDSCHs or the number of subframes having the scheduled PDSCH.

In step S1120, the UE determines whether a DL transport block is received on the PDSCH of the subframe n−k2 of the second serving cell. Herein, k1>k2.

In step S1130, the UE receives the PDSCH in the subframe n−k2, and transmits a UL transport block on the PUSCH in the subframe n, ACK/NACK corresponding to the DL transport block, and ACK/NACK based on piggyback information.

In step S1140, if the PDSCH is not received in the subframe n−k2, the UE determines whether the piggyback information indicates a specific value. The specific value may be 0.

In step S1150, if the piggyback information indicates the specific value, the UL transport block and the ACK/NACK based on the piggyback information are transmitted on the PUSCH of the subframe n. That is, ACK/NACK corresponding to a non-received PDSCH is not sent.

In step S1160, if the piggyback information does not indicate the specific value, a UL transport block, ACK/NACK corresponding to the non-received PDSCH, and ACK/NACK based on the piggyback information are transmitted on the PUSCH in the subframe n.

For example, if the piggyback information has a value greater than 0, the UL transport block, the ACK/NACK corresponding to the non-received PDSCH, and the ACK/NACK based on the piggyback information are transmitted on the PUSCH in the subframe n. The ACK/NACK corresponding to the non-received PDSCH may be NACK or DTX.

ACK/NACK to be piggybacked may vary according to whether a value of a UL DAI is 0. If the value of the UL DAI is greater than 0, the UE always piggybacks corresponding ACK/NACK even if the PDSCH is not received in the subframe n−k2.

That is, according to the aforementioned method, if the UL DAI value is a specific value, whether ACK/NACK will be piggybacked is determined according to whether a PDSCH is received irrespective of the UL DAI value as to the subframe n−k2 of the first serving cell, and otherwise, the ACK/NACK is piggybacked according to the UL DAI value.

If a TDD cell having the GU timing configuration of Table 2 and an FDD cell having a fixed timing of k=4 are aggregated, the aforementioned embodiments of FIG. 10 and FIG. 11 may be applied to a subframe marked as "0" in the following table.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | ○ | | | | | ○ | | |
| 1 | | | | ○ | | | | | ○ | |
| 2 | | | | | | | | | | |
| 3 | | | | | | | | | | |
| 4 | | | | | | | | | | |
| 5 | | | | | | | | | | |
| 6 | | | ○ | ○ | ○ | | | ○ | ○ | |

If the UL DAI is not applied to a UL grant for a UL subframe in which only ACK/NACK feedback is transmitted for one DL subframe, a subframe marked as "0" in Table 4 may be applied in the aforementioned embodiments of FIG. 10 and FIG. 11.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | |
| 1 | | | ○ | | | | | ○ | | |
| 2 | | | | | | | | | | |
| 3 | | | | | | | | | | |
| 4 | | | | | | | | | | |
| 5 | | | | | | | | | | |
| 6 | | | | | | | | | | |

Although the first serving cell may be a primary cell and the second serving cell may be a secondary cell according to the proposed embodiment, the present invention is not limited thereto.

Further, the first serving cell may be the TDD cell and the second serving cell may be the FDD cell, but the present invention is not limited thereto. The first serving cell and the second serving cell may be TDD cells having different UL-DL configurations. Alternatively, the first serving cell and the second serving cell may be cells having different DL HARQ timing configurations irrespective of whether the cell is the TDD cell or the FDD cell.

The UL grant for the UL subframe n of the first serving cell may be received in the subframe n−k1, and a plurality of PDSCHs may be transmitted in subframes n−k2, n−k3, (where k2<k1, k3<k1) in the second serving cell. That is, the number of PDSCHs transmitted through the second serving cell may be m (1<m<k1).

If m is greater than the number of DL subframes including a specific PDSCH due to the UL DAI, the UE may transmit ACK/NACK for a PDSCH of the second serving cell by using ACK/NACK remaining after excluding ACK/NACK to be transmitted according to the UL DAI.

For example, if the UL DAI value transmitted through the UL grant is 2 and if m is 3, the UE may further transmit one ACK/NACK in addition to two ACKs/NACKs based on the UL DAI. Alternatively, according to another method of the present invention, m may be the number of DL subframes in which the PDSCH can be transmitted, rather than the number of DL subframes in which the PDSCH is transmitted.

Figure 12:
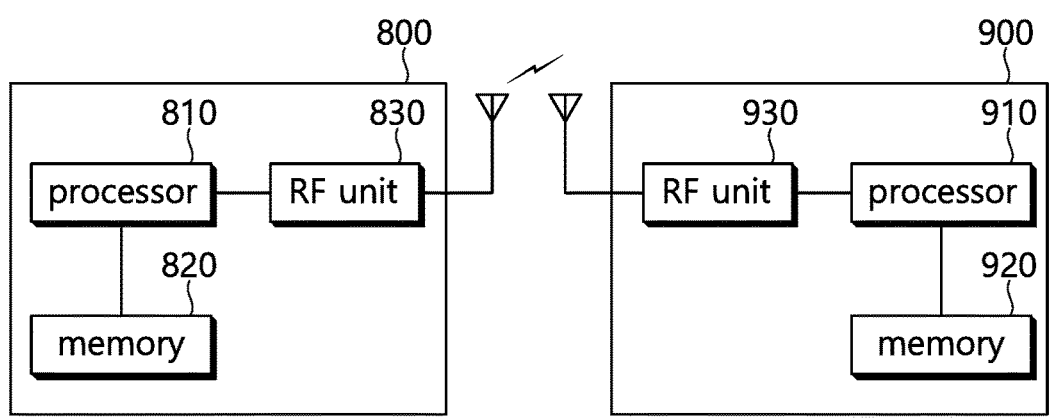
FIG. 12 illustrates a structure of a base station (BS) and a user equipment (UE) according to an embodiment of the present invention.

FIG. 12 is a block diagram illustrating a wireless communication system according to an embodiment of the present invention.

A BS 800 includes a processor 810, a memory 820, and an RF (radio frequency) unit 830. The processor 810 implements the proposed functions, procedure, and/or methods described in FIGS. 10-11. The memory 820 which is coupled to the processor 810 stores a variety of information for driving the processor 810. The RF unit 830 which is coupled to the processor 810 transmits and/or receives a radio signal.

UE 900 includes a processor 910, a memory 920, and an RF (radio frequency) unit 930. The processor 910 implements the proposed functions, procedure, and/or methods described in FIGS. 1-11. The memory 920 which is coupled to the processor 910 stores a variety of information for driving the processor 910. The RF unit 930 which is coupled to the processor 910 transmits and/or receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method of transmitting acknowledgement (ACK)/non-acknowledgement (NACK) by a terminal in a wireless communication system, the method comprising:
   receiving an uplink (UL) grant in a subframe n−k1 of a first serving cell, wherein the UL grant comprises uplink allocation and piggyback information, and the piggyback information indicates the number of first physical downlink shared channels (PDSCHs) scheduled before the subframe n−k1;
   attempting detection of a second PDSCH in a subframe n−k2 of a second serving cell; and
   transmitting an uplink transport block and ACK/NACK information through a physical uplink shared channel (PUSCH) on the basis of the uplink allocation in a subframe n,
   wherein n, k1 and k2 are integers greater than zero, where k1>k2, and
   wherein the ACK/NACK information comprises a first ACK/NACK according to the piggyback information, and a second ACK/NACK corresponding to the detected second PDSCH.

2. The method of claim 1, wherein the PUSCH is transmitted in the first serving cell or the second serving cell.

3. The method of claim 1, wherein one of the first serving cell and the second serving cell is a time division duplex (TDD) cell, and the other is a frequency division duplex (FDD) cell.

4. The method of claim 1, wherein when the second PDSCH is not detected, the ACK/NACK information comprises a NACK or discontinuous transmission (DTX) as the second ACK/NACK.

5. The method of claim 1, wherein when the second PDSCH is not detected, the ACK/NACK information does not comprise the second ACK/NACK.

6. The method of claim 5, wherein when the second PDSCH is not detected and the piggyback information indicates a specific value, the ACK/NACK information does not comprise the second ACK/NACK.

7. The method of claim 6, wherein the specific value comprises 0.

8. The method of claim 1, wherein the second ACK/NACK is always piggybacked through the PUSCH irrespective of the number of the first PDSCHs.

9. A terminal for transmitting acknowledgement (ACK)/not-acknowledgement (NACK) in a wireless communication system, the terminal comprising:
   a transceiver; and
   a processor, operatively coupled to the transceiver, that:
   controls the transceiver to receive an uplink (UL) grant in a subframe n−k1, wherein the UL grant comprises uplink allocation and an UL-downlink assignment index (DAI), and the UL-DAI indicates the number of subframes transmitting a first physical downlink shared channel (PDSCH) for the terminal,
   attempts to detect a second downlink transport block on a second PDSCH in a subframe n−k2; and
   controls the transceiver to transmit an uplink transport block and ACK/NACK information through a UL shared channel on the basis of the uplink allocation in a subframe n, wherein n, k1 and k2 are integers greater than zero, where k1>k2, wherein the ACK/NACK information comprises a first ACK/NACK regarding one or more first DL transport blocks corresponding to the number of subframes indicated by the UL-DAI and a second ACK/NACK regarding the detected second DL transport block.

* * * * *